Dec. 15, 1953 D. G. KINGSLEY 2,662,647
APPARATUS FOR DISPENSING SLATS
Filed July 7, 1951 6 Sheets-Sheet 1

INVENTOR.
David G. Kingsley
BY
Curtis, Morris + Safford
ATTORNEYS.

Fig. 3

Dec. 15, 1953    D. G. KINGSLEY    2,662,647
APPARATUS FOR DISPENSING SLATS
Filed July 7, 1951    6 Sheets-Sheet 4

Fig. 4

INVENTOR.
David G. Kingsley
BY Curtis, Morris & Safford
ATTORNEYS.

Dec. 15, 1953  D. G. KINGSLEY  2,662,647
APPARATUS FOR DISPENSING SLATS
Filed July 7, 1951  6 Sheets-Sheet 5

INVENTOR.
David G. Kingsley
BY Curtis, Morris & Safford
ATTORNEYS.

Patented Dec. 15, 1953

2,662,647

UNITED STATES PATENT OFFICE 2,662,647

APPARATUS FOR DISPENSING SLATS

David G. Kingsley, Mountain Lakes, N. J., assignor to Stapling Machines Co., Rockaway, N. J., a corporation of Delaware Application July 7, 1951, Serial No. 235,638

4 Claims. (Cl. 214—8.5)

This invention relates to apparatus for mechanically dispensing thin side material or "slats" to wirebound box and crate making machines. The invention is particularly adapted for use in connection with machines of the type disclosed in United States Patents No. 2,304,510 and No. 2,482,370.

Heretofore the manual operation of placing the thin box-part material or slats, separately at spaced intervals between space blocks carried by the box-parts-conveying elements of such wirebound box and crate making machines as referred to in the above-named patents, has required considerable skill, dexterity, and experience on the part of the operators. The tendency toward increase in operating speed of such machines, to the end of reducing manufacturing costs, has been restricted because the difficulty of manually placing the slats into correct positions on the conveying elements of such machines increases proportionally to the rate of speed. With the slat-laying personnel already working near the limit of their capacity, it has been impossible to increase machine speeds without increasing the numbers of persons tending each machine, which has made substantial savings impossible.

Attempts have heretofore been made to provide apparatus for mechanically placing the slats on the conveying elements, but such apparatus has encountered difficulty in operation due to the irregular shape and dimensions of the slat material. This thin material often made of very low grade lumber and improperly dried, tends to curl, to twist, to split, or to break off along the edges. Devices adapted to engage only the bottom slat in a stack of such slats have therefore many times engaged the next slat above and have forced; or tried to force, two slats from the stack instead of one, with resulting improper placement of the slats on the conveying elements or possible jamming of the dispensing apparatus.

Especially where the bottom slat is too narrow or is broken off, so that the trailing edge of the next slat above overhangs it, and where the trailing edge of such next slat is curled downwardly the slat-engaging elements will tend to engage the second slat as well as the bottom slat and produce such a malfunction.

The present invention provides a slat-dispensing apparatus which largely eliminates this difficulty. This apparatus includes reciprocable slat-engaging elements and means for automatically adjusting the feeding strokes of such elements so that they commence at the trailing edge of the bottom slat in the stack, wherever that may be, rather than commencing at a point just beyond the trailing edge of a slat of normal width, thus substantially obviating the possibility that said slat-engaging elements will engage an overhanging edge of the next slat above.

Generally, the apparatus disclosed herein comprises a slat hopper of skeleton-like framework with front and rear guides to direct the downward movement of the slats, causing them to finally rest upon supports extending upwardly from the slat feeding units, thereby properly positioning in the hopper the bottom slat to be contacted and fed out by feeding hooks pivotally mounted in the slat feeding units. At the rear side and adjacent the bottom of the slat hopper, there are adjustably mounted hinged exit gates which permit, under normal conditions, only the bottom slat to be fed from the hopper. However, with an overloading of said exit gates, due to abnormal slats that are exceptionally thick, warped, or rough surfaced, the exit gates will be forced open to allow the abnormal slats to be fed out, thus preventing an overloading or jamming of the slat feeding mechanism.

The elements comprising a slat feeding unit include a bed plate having conveniently mounted thereon in suitable ways and slides a driving frame, an inner feeding slide carrying a feeding hook and ratchet, and a pivotally-mounted pawl. A reciprocating movement is imparted to the spring-connected inner feeding slide and driving frame, moving the feeding hooks through feeding and return strokes. On the return strokes, the feed hooks are spring urged against the under surface of the bottom slat. The pawl, which is pivotally mounted on the bed plate adjacent the under surface of the ratchet and feeding hook engages the ratchet on the feeding hook assembly and stops the return stroke of the feeding hook as soon as the feeding hook clears the trailing edge of the bottom slat.

Means whereby the slat feeding units may be synchronized to properly feed slats in accordance with the pattern of space blocks carried by the rapidly moving conveying elements is incorporated in the combination comprising two adjustably positioned electric switches and a variable speed drive pulley keyed to the shaft of the motor providing the source of power.

Figure 1:
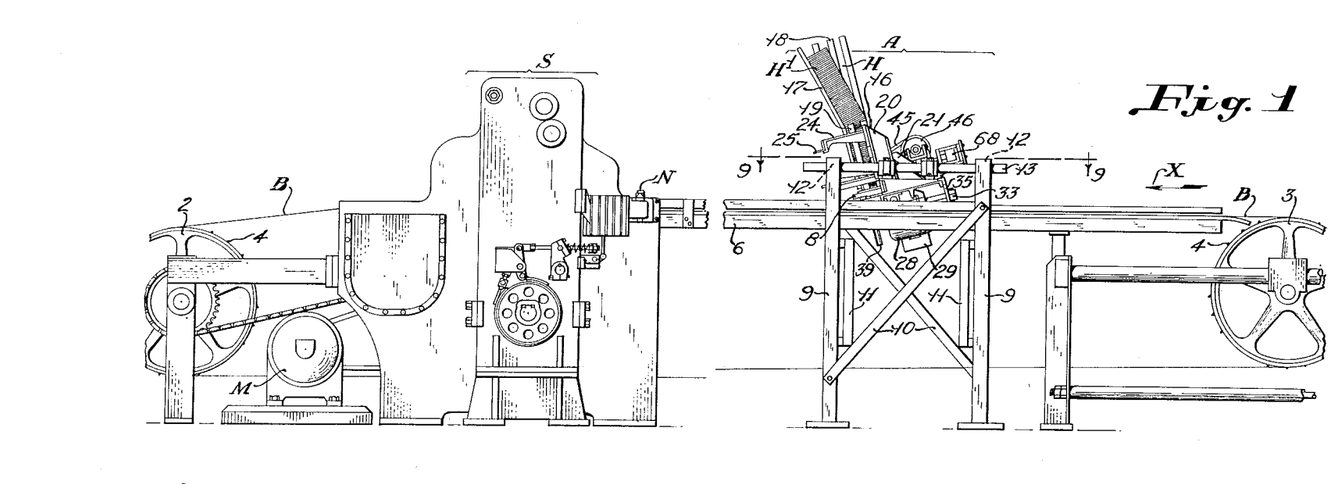
Figure 1 is a more or less diagrammatic longitudinal view of the lefthand side of a wirebound box and crate manufacturing machine, including, in proper relative position, slat feeding apparatus embodying features of the present invention.

As shown in Figure 1, the slat feeding device, generally designated A, is placed in operating position near the front or input end of a wirebound box or crate making machine. Such machines are provided with a box-parts conveyor comprising a pair of parallel endless conveyor bands B which are trained about drive sprockets 2 at the rear or output end of the machine and about idler sprockets 3 at the front or input end of the machine. Said sprockets 2 and 3 have projecting outwardly from their faces, short studs 4 which cooperate with holes 5 in conveyor bands B (Figure 9) to impart a positive drive and alignment to said bands B whose upper run is supported by longitudinal rails 6 which extend from the front of the machine to a convenient point beyond a transverse row of staplers between machine side walls generally designated S.

Figure 2:
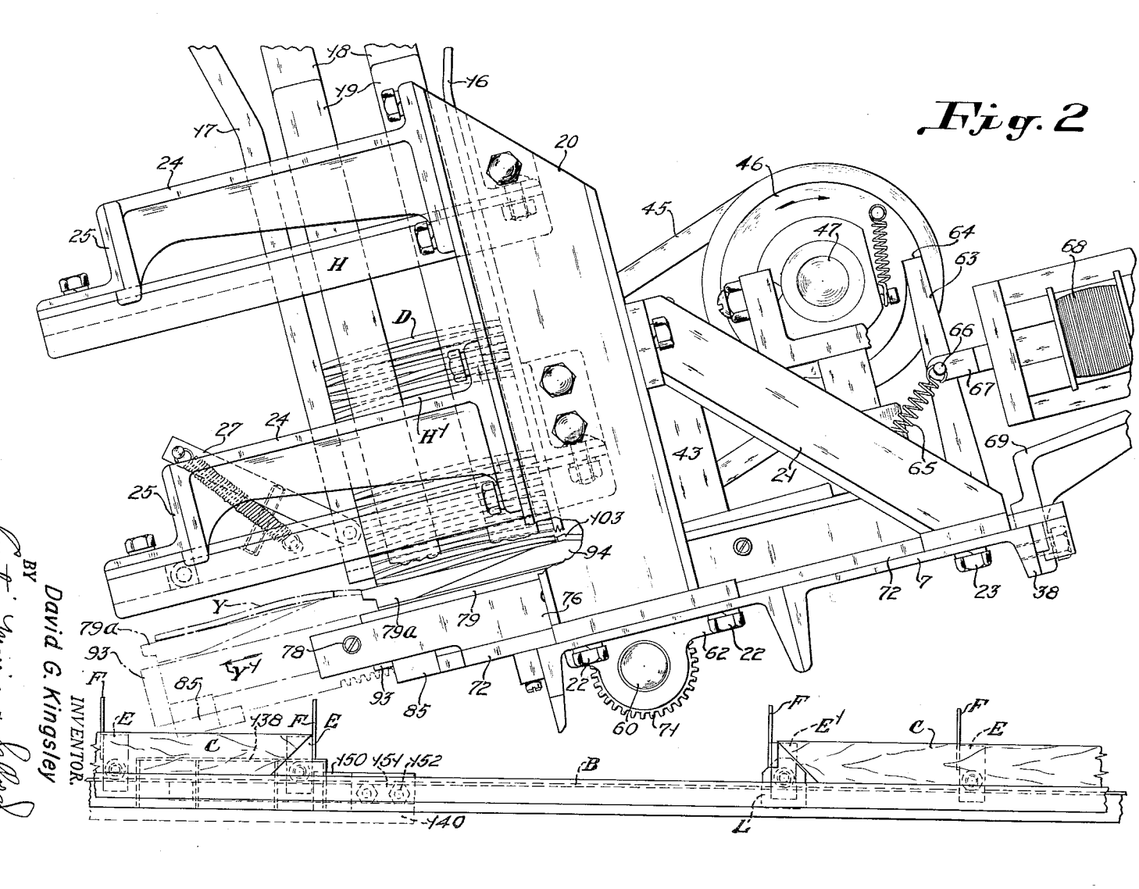
Figure 2 is an enlarged fragmentary view of one side of the body portion of the apparatus, with some parts omitted for clarity.
Figures 9, 10:
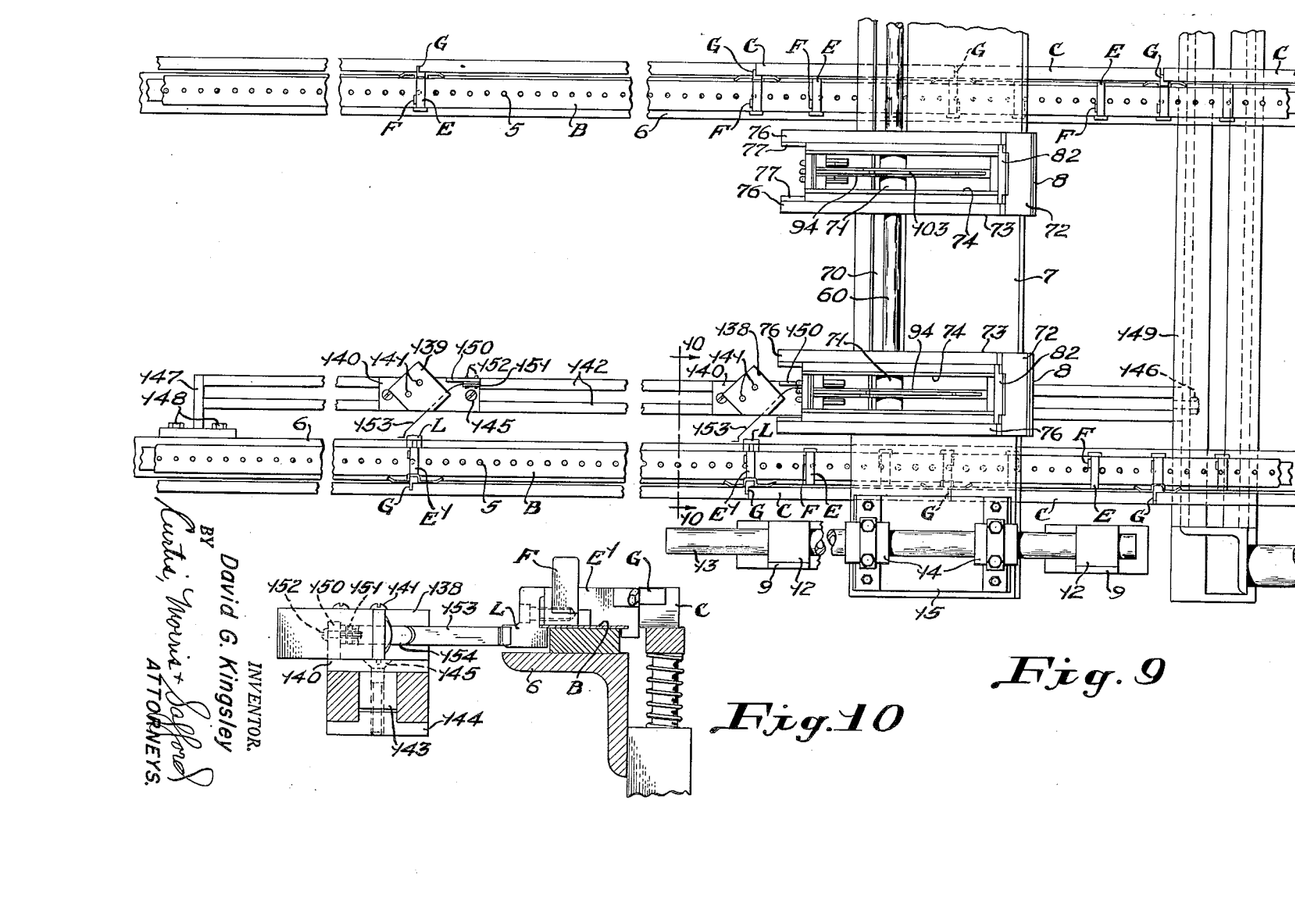
Figure 9 is a fragmentary sectional view taken on the line 9—9 of Figure 1, with some parts omitted for clarity, and showing, more or less diagrammatically, two slat feeding units in proper position and a pair of electric switches to start and stop the operation of said units.
Figure 10 is a fragmentary sectional view taken on the line 10—10 of Figure 9, showing means for actuating the electric switches to start and stop a slat feeding operation.

Conveyor bands B have adjustably fastened thereto space blocks E which provide for spacing and aligning box part cleats C and slats D in accordance with a desired pattern to be presented to said transverse row of staplers at S for a staple driving operation where said box parts are stapled together to form box-part units or complete box blanks. As shown in Figures 2, 9, and 10, and particularly in Figure 10, space blocks E are provided with upstanding fins F to engage slats D, while an additional horizontally-projecting finger G is also provided on certain space blocks to engage cleats C. With further reference to Figures 2, 9, and 10, it will be seen that the space blocks E′, which are the leading space blocks of each unit or blank setup, carries lug L whose function is to actuate certain electric switches, to be more fully explained hereinafter.

The construction of the supporting framework of the slat feeding device A is such as to provide for the transverse base member 7, upon which the slat feeding units 8 (Figure 9) are adjustably secured, to bridge conveyor bands B. Integrally mounted at the top of upstanding supports 9 at either side of the machine, of said framework cross-braced by members 10 and 11, are blocks 12 (Figure 9) having adjustably mounted therein support bars 13 which have clamped thereabout hangers 14 fastened to an angle-shaped bracket 15 bolted to the upper surface, adjacent the ends of base member 7, causing it to be suspended at an angle of approximately 15°, thereby providing a desirable inclination toward the staplers at S (Figure 1) to facilitate in the feeding of slats D between the fins F of space blocks E and E′ carried by the conveyor bands B, as shown in Figures 1 and 2.

Figure 7:
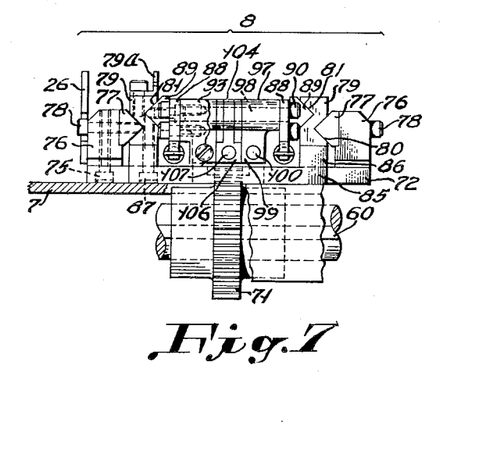
Figure 7 is an end elevation as viewed from the lefthand side of Figure 4.
Figure 8:
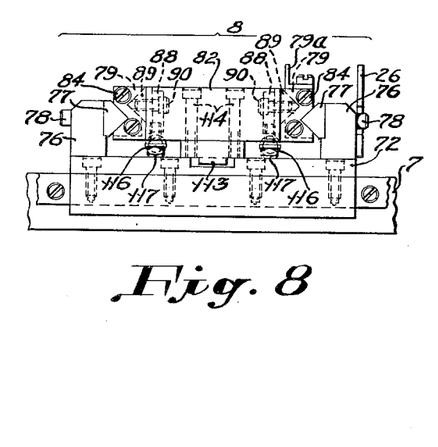
Figure 8 is an end elevation as viewed from the righthand side of Figure 4.

With further reference to said figures, it may be seen that a hopper H mounted on base member 7 projects upwardly therefrom to provide a means for holding a supply stack of slats H′. Hopper H is of open framework construction, and has incorporated therein guides 16 and 17 at its front and rear sides respectively, and spaced flat members 18 and 19 at its sides, the flat members 19 at the near side, as shown in Figures 1 and 2, being shorter to permit easy access to replenish the stack of slats H′ which rests upon and is supported by upstanding plates 20 fastened to the outer face of support members 76 at the inner sides of slat feeding units 8 and L-shaped members 79a fastened to the top surface of side members 79 (Figures 7 and 8).

As may be seen in Figure 2, the framework of hopper H is supported by upstanding channel members 20 braced by angle members 21 and secured to base member 7 by bolts 22 and 23 respectively. To the lefthand face of channel members 20 are bolted projecting arms 24 which support at their ends angle members 25 to which rear guides 17 and exit gates 27 are secured, said angle members 25 having longitudinal slots to permit lateral adjustment of the rear guides 17 and exit gates 27. The exit gates 27 are of similar design and purpose as those described and illustrated in United States application Serial No. 201,556 filed December 19, 1950.

Figure 3:
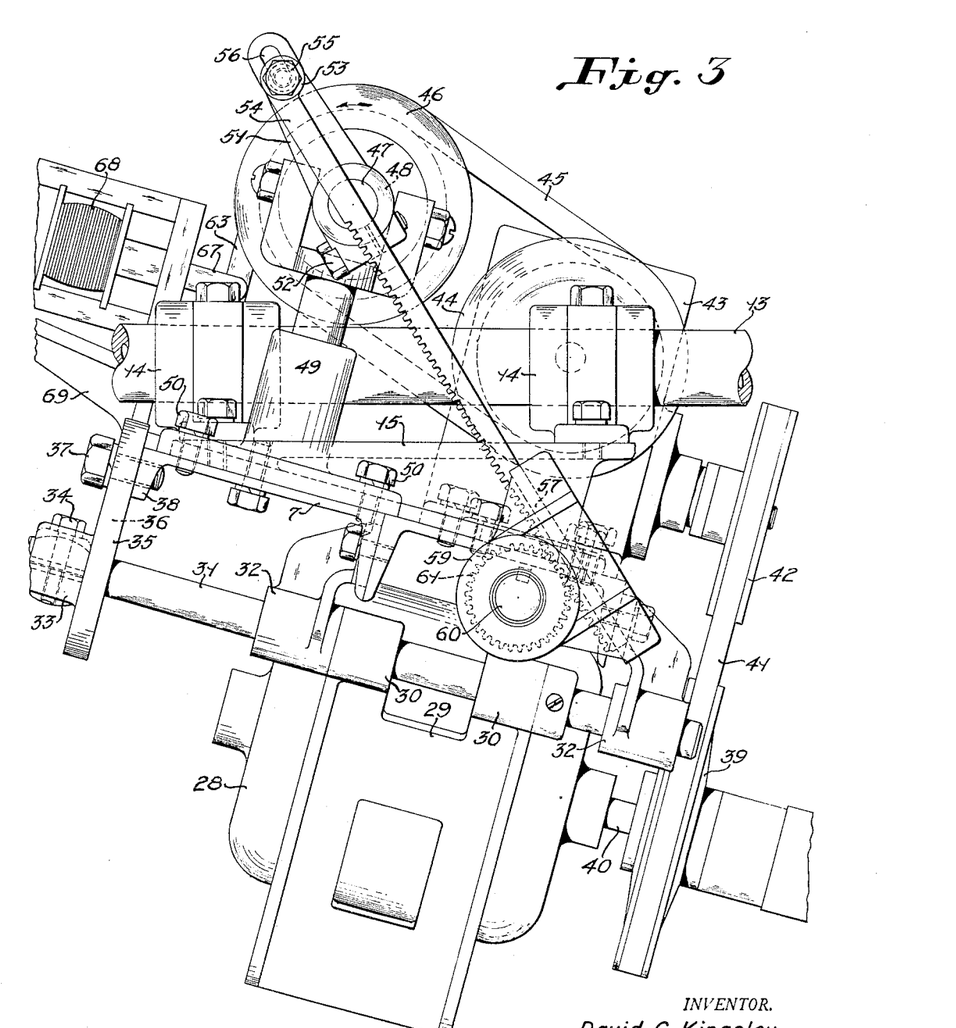
Figure 3 is an enlarged fragmentary view of the oppositely disposed side of the body portion of the apparatus shown in Figure 2, showing means to impart a reciprocating movement to the slat feeding elements.

With reference to Figure 3, which shows the oppositely-disposed end of base member 7 from that shown in Figure 2, there is shown means to provide power to impart a reciprocating movement to the feeding elements of slat feeding units 8. Motor 28 is secured to hanger 29 provided with ears 30 which are keyed on a transversely positioned shaft 31 mounted in bearings 32 bolted to base member 7, thus providing for the adjustment of motor 28 by a swinging movement. Shaft 31 extends to the left (Figure 3) and is secured to an arm 35 by a split hub 33 and clamping bolt 34. The arm 35 has shaped therein a radial slot 36 to cooperate with a bolt 37 threaded in the downwardly projecting flange 38 of base member 7 to secure motor 28 in the position desired. Motor 28 with variable speed pulley 39 keyed to its shaft 40 provides the desirable feature of obtaining a suitable speed imparted to a normally one-revolution clutch 46 through its driving connection with said pulley 39 by means of V-belt 41, pulley 42, speed reducer 43, pulley 44, and V-belt 45.

To the end of clutch shaft 47 (Figure 3), which is rotatably mounted in a bearing 48 supported by upstanding member 49 fastened to base member 7 by bolts 50, an eccentric crank arm 51 is securely clamped by a screw 52. A rack bar 54 is pivotally mounted to the oppositely disposed end of said crank arm 51 by means of a bolt and nut assembly 55, the bolt extending through an eye 53 in rack bar 54 and slidably through an elongated slot 56 in crank arm 51. Rack bar 54 is provided with teeth along its under surface, said teeth being held in engagement with a spur gear 61 on shaft 60 by a hub member 59 rockably mounted on the same shaft, and having a groove 57 adapted slidably to receive the rack bar 54. The shaft 60 is journaled in bearings 62 (Figure 2) fastened at convenient points to the under surface of base member 7. It will thus be seen that this driving mechanism imparts to shaft 60 a rotation first in one direction and then in the other.

With reference to Figures 2 and 3, and particularly to Figure 2, there is shown mechanism by which clutch 46 is caused to engage and disengage clutch shaft 47. Said clutch operating mechanism comprises a vertically positioned trip lever 63 pivotally mounted in a bracket (not shown) fastened to the surface of base member 7 and continually urged toward contact with step 64 in trip cam contour, by a tension spring 65 with its lower end anchored and its opposite end hooked about a pin 66 which pivotally fastens forked arm 67 of a solenoid 68 to trip lever 63. Solenoid 68 is supported on a bracket 69 bolted to the outer surface of the downwardly projecting flange 38 of base member 7.

Figure 6:
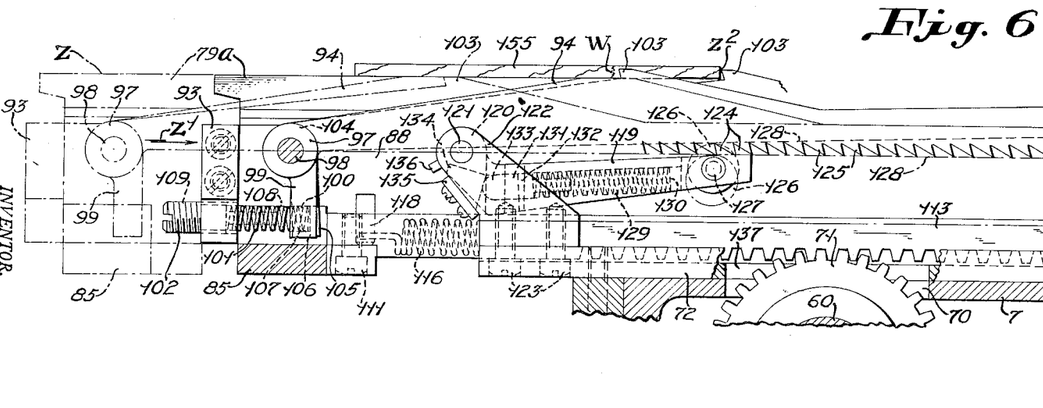
Figure 6 is an enlarged fragmentary view of the lefthand portion of Figure 5, showing means for automatically adjusting the stroke of the slat feeding elements to feed narrow or broken slats.

As shown in Figures 6 and 9, base member 7 has an elongated opening 70 running longitudinally adjacent its lefthand edge, which provides clearance for spur gears 71 (one provided for each slat feeding unit 8) to engage rack bar 113 (Figure 6) of feeding units 8 at any desired point within the range of longitudinal spacing of slat feeding units 8 on base member 7. The spur gears 71 are keyed on the shaft 60 and partake of the oscillatory rotation previously described.

As shown in Figures 4, 5, 6, 7, and 8, a slat feeding unit 8 comprises generally a bed plate 72 with pawl 119 suitably mounted thereon, a reciprocating driving frame 73 with rack bar 113, an inner feeding slide 74 carrying feeding hook 103 and ratchet 94.

Figure 4:
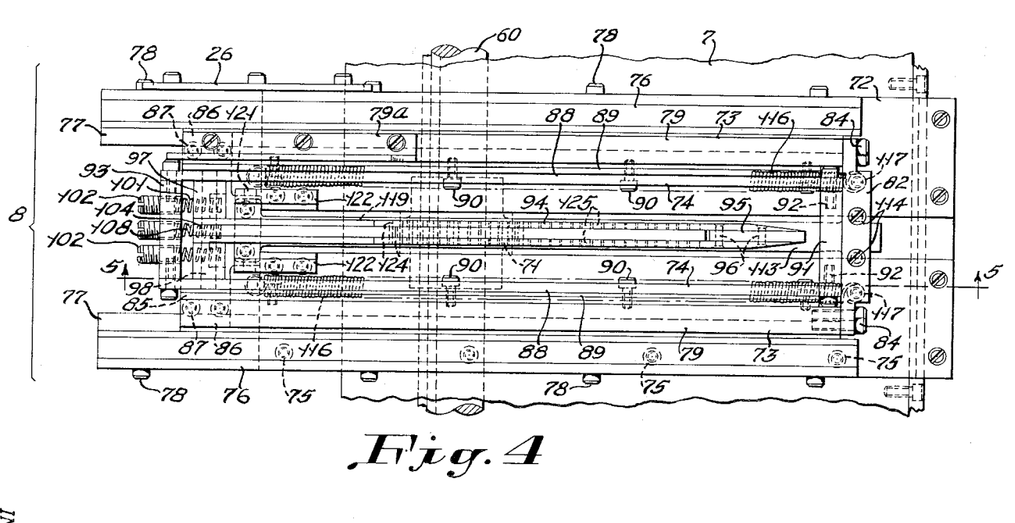
Figure 4 is a top plan view of one of the slat feeding units of the apparatus.

As shown in Figures 4, 7, and 8, support members 76 with slides 77 attached to their inner faces by screws 78 are themselves attached to the outer edges of bed plate 72 by screws 75. The construction of driving frame 73 is shown in detail in Figures 4, 5, 6, 7, and 8. Longitudinal side members 79 are held in spaced relationship at the right end by end plate 82 (Figure 5) held in place by screws 84. At the left end, plate 85 is fastened to the under side of side members 79 by screws 87. Rack bar 113 is attached to end plates 82 and 85 by screws 114 and 111 through lugs at either end. Longitudinal side members 79 of rectangular-shaped driving frame 73 have shaped in their outer faces near the bottom, ways 80, and in their inner faces near the top, ways 81 (Figure 7). The shaped-out area between legs 86 of plate 85 (Figure 7) allows inner feeding slide 74 to pass freely beyond the end of driving frame 73.

Figure 5:
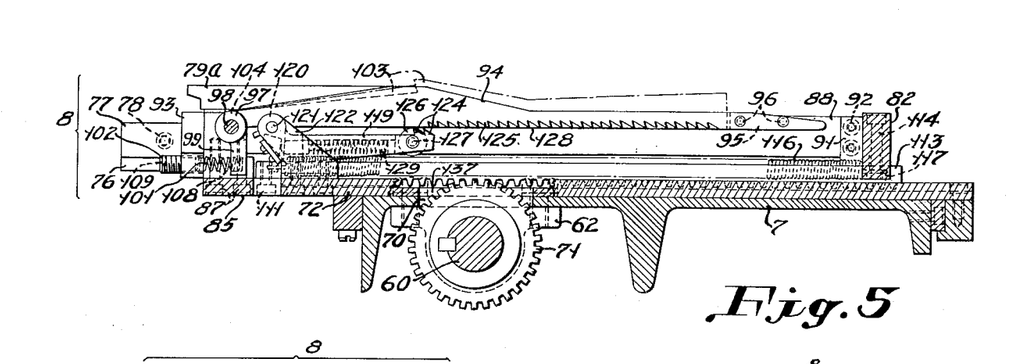
Figure 5 is a sectional view taken on the line 5—5 of Figure 4, showing the slat feeding elements and means to drive them.

With further reference to Figures 4, 5, and 7, inner feeding slide 74, also of rectangular shape, nests within driving frame 73 and comprises longitudinal side members 88 having slides 89 fastened by screws 90 (Figures 4 and 7) to the outer faces, near the top. The righthand end of said feeding slide 74 (Figure 4) is closed by plate 91 interposed between side members 88 and secured by screws 92, with the oppositely disposed end closed by plate 93 positioned and secured in the same manner as plate 91. Split ratchet member 94, with its loose end shown at the righthand side in Figure 4, spaced apart by spacer 95 and secured by rivets 96, and its open opposite end bearing spacers 97, is centered between side members 88 and pivotally mounted on pin 98.

As shown in Figures 5, 6, and 7, the spacers 97 have, projecting downwardly from each portion, fingers 99 provided with counterbores 100 (Figure 6) near their bottom outer faces to receive therein the ends of horizontally-positioned compression springs 101. The opposite ends of springs 101 are supported on the reduced diameter ends of adjusting screws 102 threaded in the reduced width portion of plate 93, near its bottom.

With further reference to Figures 4, 5, 6, and 7, and particularly to Figure 6, a feeding hook 103 of thin cross-section is positioned in the opening provided by split ratchet member 94, with its righthand end free and its opposite end 104 pivotally mounted on pin 98 and also provided with a downwardly projecting finger 105 (Figures 6 and 7) supporting a head 106 carrying a counterbore 107 to receive therein the end of a horizontally-positioned compression spring 108. The opposite end of spring 108 is supported by the reduced diameter of adjusting screw 109 which is threaded in plate 93 in the same manner as screws 102.

While driving frame 73 and inner feeding slide 74 are independently supported by their respective ways and slides, as previously described, they are, however, spring connected, as will be seen with reference to Figure 4, where there are shown elongated tension springs 116 positioned adjacent the under surface of side members 88 of inner feeding slide 74. Said springs 116 have their ends at the righthand side of Figure 4 hooked about screws 117 extending downwardly from the bottom of plate 82 of driving frame 73 (Figures 4, 5, and 8), while the oppositely disposed ends of springs 116 are hooked about downwardly projecting studs 118 extending from the bottom surface of side members 88 of inner feeding slide 74, shown clearly in Figure 6.

Cooperating with split ratchet member 94 and feeding hook 103 to provide the feature of automatically adjusting the stroke of inner feeding slide 74, is pawl 119, shown in Figures 4, 5, and 6. The angular-shaped head 120 of pawl 119 has shaped in its upper surface a grooved-out area to allow split ratchet member 94 to pass therethrough with ample clearance, with the eared portion of head 120 pivotally mounted on short pins 121 carried at a convenient point in the upper portion of angular-shaped brackets 122 positioned at either side of split ratchet member 94 and fastened at the lefthand edge of bed plate 72 by screws 123 (Figure 6).

The opposite end of pawl 119 has shaped in each side of its top surface two upwardly projecting teeth 124 adapted to mesh with teeth 125 of split ratchet member 94. With further reference to the same end of pawl 119, it will be seen that between teeth 124 there is provided a slot in which a roller 126 is rotatably mounted on a pin 127, with the working face of said roller at a height corresponding with that of the points of teeth 124.

Roller 126 is held in contact with the bottom face 128 of feeding hook 103 (Figure 5) by the action of a compression spring 129 contained within a hollowed portion of pawl 119 and interposed between counterbore 130 and a pin 131 slidably mounted in hole 132. The spherical head 133 of pin 131 is in contact with an angled face of a block 134 mounted on the inside face of a cross-tie member 135 fastened to the inclined side of angular-shaped brackets 122. To prevent the loose end of pawl 119 with roller 126 from rising too high, stop pin 136 is conveniently positioned in angular-shaped head 120 of pawl 119, to contact cross-tie 135. Further reference to Figures 4, 5, 6, and 7 shows in bed plate 72 a rectangular-shaped opening 137 through which spur gear 71 projects to a convenient height to mesh with teeth of a rack bar 113 mounted on the under surface of driving frame 73, thereby providing means to impart a reciprocating movement to the feeding elements of slat feeding units 8.

Referring to Figures 9 and 10, there is shown means to start and stop a slat feeding operation during which a desirable number of slats are fed into the spaces between upstanding fins F of space blocks E and E' of one unit of work comprising a complete box or crate blank. Start switch 138 and stop switch 139 positioned at a convenient angle and fastened to T-shaped base 140 by screws 141, are made adjustably secure on longitudinal support bars 142 by means of leg 143 of T-shaped base 140 slidably positioned between said bars 142, with clamp plate 144 and screw 145. Support bars 142 are positioned parallel to and a convenient distance from the inner face of conveyor band support rail 6 at the near side in Figures 1 and 9. The righthand end of support bars 142 is secured by bolt 146 to transverse angle support 149, while the oppositely disposed end thereof is supported and secured by bracket 147 fastened to the inner face of conveyor band support rail 6 by bolts 148.

T-shaped base 140 has integrally secured thereto at its upper righthand corner (Figure 9) upwardly extending flange 150 which supports an anchorage for spring fingers 153 by means of clamp plates 151 and screws 152. Said spring fingers 153 are so shaped as to extend outwardly at a right angle to spring pressed plungers 154 of said start and stop switches 138 and 139, with the trigger-shaped outer ends of spring fingers 153 in the path of the lug L of the leading space block E' for each box or crate blank, thereby providing means to actuate both start switch 138 and stop switch 139 as lugs L are moved thereto by conveyor band B.

To describe the operation of slat feeding device A, reference is first made to Figures 1 and 3. Motor M of the box or crate making machine and motor 28 of the slat feeding device A are energized simultaneously by the manual operation of an electric switch of said machine. With operator's lever N (Figure 1) moved to "run" position, the machine's conveyor bands B with lead blocks E' and intermediate space blocks E, move in the direction indicated by arrow X of Figure 1.

As shown in Figures 2 and 9, cleats C are placed in their proper spaces between horizontally-projecting fingers G prior to passing beneath base member 7 of slat feeding device A. Continued movement of conveyor bands B cause lug L of lead space block E' to contact the trigger-shaped end of spring finger 153 to press its body portion against spring-pressed plunger 154, thereby actuating start switch 138 and simultaneously operating solenoid 68. With the operation of solenoid 68, trip lever 63 is removed from step 64, thereby allowing clutch 46 to impart a clockwise rotation to shaft 47 (Figure 2). As shown in Figure 3, which pictures the opposite end of shaft 47 and accordingly shows a counter-clockwise rotation of the shaft, crank arm 51 will be rotated by shaft 47 to drive rack bar 54 diagonally downward and impart clockwise rotation to spur gear 61 and shaft 60 keyed thereto.

As may be seen in Figures 2 and 6, this action will, through the driving assembly of spur gear 71 and rack bar 113 of each slat feeding unit 8, impart to the slat feeding elements a movement diagonally downward and to the left. The feeding hook 103 will thus be caused to engage the edge of the bottom slat of the stack of slats H', which rests upon upstanding members 79a, and feeds said slat out of the hopper H, as shown by dot-and-dash lines Y in Figure 2. At the end of a full stroke in said direction, slat D will be placed atop cleat C and between upstanding fins F of space blocks E.

With reference to Figure 6, there is indicated by dot-and-dash lines Z the return stroke of said feeding elements in the direction of arrow Z'. Split ratchet member 94 and feeding hook 103 pivotally mounted to inner feeding slide 74, as previously described, are continually urged upward by springs 101 and 108, respectively, to force said feeding elements against the under surface of the bottom slat to be fed next. The contour of the top surfaces of split ratchet member 94 and feeding hook 103 is such that while in contact with the under surface of the bottom slat on their return stroke, the bottom surface 128 of feeding hook 103 is in contact with roller 126 (shown by dot-and-dash lines), thus preventing engagement of the teeth 125 of split ratchet member 94 and the teeth 124 of pawl 119.

It will be noted from the position of the elements just described that when the bottom slat is of the proper width, the split ratchet member 94 and pawl 119 are held inoperative throughout the return stroke, thereby allowing driving frame 73 and inner feeding slide 74 to move as one unit, with feeding hook 103 (shown at $Z^2$—Figure 6) engaging the trailing edge of the bottom slat. However, with said elements returning under a bottom slat which is narrower or which is narrower at one end due to a diagonal piece having been broken away from its trailing edge (such as shown by slat 155—Figure 6), feeding hook 103, upon reaching the trailing edge of said slat, will move upward relative to split ratchet member 94. Roller 126 (shown in full lines, Figure 6) on pawl 119 will follow the upward movement of the bottom surface 128 of feeding hook 103, allowing engagement of the teeth 124 of pawl 119 with the teeth 125 of split ratchet member 94. This stops any further return movement of inner feeding slide 74, with feeding hook 103 slightly beyond the trailing edge W of the narrower end of bottom slat 155. Driving frame 73, being connected to inner feeding slide 74 by springs 116, as previously described, continues its return stroke to completion at the starting point.

On the next feeding stroke, driving frame 73 moves again in the direction indicated by arrow Y' (Figure 2), during which movement its plate member 82 will contact and move inner feeding slide 74 from its stopped position described above to complete a full feeding stroke. In so doing, the teeth 125 of split ratchet member 94 and teeth 124 of pawl 119 are disengaged, and slat 155 is properly fed out.

It will thus be understood that the mechanism described results in automatically and independently adjusting the stroke of each of the feeding hooks 103 so that its feeding stroke always commences at the trailing edge of the bottom slat, even though that slat may be too narrow, or may have an uneven trailing edge.

Means for synchronizing the feeding of slats by slat feeding units 8 in accordance with the pattern of space blocks E and E' for each unit of work attached to the continuously moving conveyor bands B, are incorporated in the mechanism of slat feeding device A. One such means is provided in variable speed drive pulley 39 keyed to shaft 40 of motor 28, wherein said pulley 39 is provided with cooperating halves which may be adjusted toward or away from each other to increase or decrease its diameter to provide variable driving speeds by which a wide selection of desirable speeds may be imparted to the slat feeding elements of slat feeding units 8. Also to cooperate therewith is start switch 138 and stop switch 139 which are provided a wide latitude of adjustment along their support bars 142 to initiate the starting and stopping of a complete slat feeding operation in accordance with the length of each box unit or box or crate blank.

It will be appreciated that the mechanism described and shown herein in large measure eliminates the difficulties heretofore experienced in the feeding of narrow, broken and curled slats. However, it should be emphasized that this mechanism is intended merely as illustrative and not as restrictive of the invention.

I claim:

1. Apparatus for dispensing slats to a box- or crate-making machine comprising a hopper for holding a stack of slats, and means for feeding slats singly from one end of said stack comprising reciprocably mounted slat-engaging elements adapted to engage the trailing edge of the slat at said end of the stack, driving means for reciprocating said slat-engaging elements through feeding and return strokes, and stop members adapted to engage said slat-engaging elements and stop the return strokes thereof when said slat-engaging elements reach the trailing edge of said end slat.

2. Apparatus for dispensing slats to a box- or crate-making machine comprising a generally vertical hopper for holding a stack of slats, supporting members at the lower end of said hopper for supporting said stack of slats, and means for feeding said slats singly from said stack comprising reciprocably mounted slat-engaging elements adapted to engage the trailing edge of the bottom slat in said stack, driving means for reciprocating said slat-engaging elements through feeding and return strokes, and stop members adapted to engage said slat-engaging elements and stop the return strokes thereof when said slat-engaging elements reach the trailing edge of said bottom slat.

3. Apparatus for dispensing slats to a box- or crate-making machine comprising a generally vertical hopper for holding a stack of slats, supporting members at the lower end of said hopper for supporting said stack of slats, and means for feeding said slats singly from said stack comprising reciprocably mounted slat-engaging elements adapted to engage the trailing edge of the bottom slat in said stack, driving means for reciprocating said slat - engaging elements through feeding and return strokes, means yieldably urging said slat-engaging elements upwardly toward said stack of slats whereby said slat-engaging elements bear against the underside of the bottom slat in said stack on said return strokes, stop members adapted to engage said slat-engaging elements and stop the return strokes thereof, means yieldably urging said stop members toward engagement with said slat-engaging elements, said stop members and said slat-engaging elements being mechanically linked to hold said stop means from engagement with said slat-engaging elements until said slat-engaging elements reach the trailing edge of said bottom slat in said return strokes and move upwardly.

4. Apparatus for dispensing slats to a box- or crate-making machine comprising a generally vertical hopper for holding a stack of slats, supporting members at the lower end of said hopper for supporting said stack of slats, and means for feeding said slats singly from said stack comprising at least two slat feeding units each including a frame, a first slide mounted for reciprocation in a plane adjacent and generally perpendicular to the lower end of said stack, a second slide mounted for reciprocation relative to said frame in a plane adjacent and generally parallel to the plane of reciprocation of said first slide, spring means interconnecting said first and second slides for normal movement together, drive means for reciprocating said slides through feeding and return strokes, a feed hook mounted on said second slide for vertical movement with respect thereto and adapted to engage the trailing edge of said bottom slat to feed the same from said hopper on said feeding stroke, spring means urging said feeding hook upwardly toward said stack of slats whereby said feeding hook bears against the under side of the bottom slat on said return strokes, a ratchet member mounted on said second slide for vertical movement with respect thereto, spring means urging said ratchet member upwardly toward said stack of slats whereby on said return strokes, the back of said ratchet member bears against the under side of the bottom slat in said stack adjacent the point of contact of said feeding hook, a pawl means mounted on said frame for vertical movement with respect thereto, and spring means urging said pawl toward engagement with said ratchet member, said pawl means having a part engaging said feeding hook to hold said pawl means out of engagement with said ratchet member when said feeding hook is depressed by contact with the under side of said bottom slat but permitting engagement of said pawl means with said ratchet member when said feeding hook reaches the trailing edge of said bottom slat and is allowed to move upwardly with respect to said ratchet member, whereby to stop the return stroke of said second slide against the resistance of the spring means interconnecting it with said first slide and position said feeding hook at the trailing edge of said bottom slat for commencement of its next feeding stroke.

DAVID G. KINGSLEY.

No references cited.